(12) United States Patent
Vadde Makkalla et al.

(10) Patent No.: US 12,126,526 B2
(45) Date of Patent: Oct. 22, 2024

(54) PREVENTING GENERATION OF DUPLICATE NETWORK ROUTES IN A SOFTWARE DEFINED WIDE AREA NETWORK

(71) Applicant: HEWLETT PACKARD ENTERPRISE DEVELOPMENT LP, Houston, TX (US)

(72) Inventors: Krishna Nataraj Vadde Makkalla, Bangalore (IN); Kareti Manoj Kumar Reddy, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/224,521

(22) Filed: Apr. 7, 2021

(65) Prior Publication Data

US 2022/0224638 A1  Jul. 14, 2022

(30) Foreign Application Priority Data

Jan. 8, 2021  (IN) .............................. 202141000894

(51) Int. Cl.
*H04L 45/42* (2022.01)
*H04L 45/00* (2022.01)
(Continued)

(52) U.S. Cl.
CPC .............. *H04L 45/42* (2013.01); *H04L 45/02* (2013.01); *H04L 45/24* (2013.01); *H04L 45/566* (2013.01); *H04L 45/74* (2013.01)

(58) Field of Classification Search
CPC ......... H04L 45/42; H04L 45/02; H04L 45/24; H04L 45/566; H04L 45/74;
(Continued)

(56) References Cited

U.S. PATENT DOCUMENTS 9,038,151 B1 *  5/2015  Chua ....................... H04L 47/10
                                                           726/1
9,178,797 B2 *  11/2015  Scudder ................ H04L 45/021
(Continued)

FOREIGN PATENT DOCUMENTS

EP       2978175 A1 *  1/2016  ............. H04L 45/02
EP       3509256 A1 *  7/2019  ......... H04L 12/4633
(Continued)

OTHER PUBLICATIONS

Update consistency in software-defined networking based multicast networks Thomas Kohler;Frank Dürr;Kurt Rothermel 2015 IEEE Conference on Network Function Virtualization and Software Defined Network (NFV-SDN) Year: 2015 | Conference Paper | Publisher: IEEE (Year: 2015).*

(Continued)

*Primary Examiner* — Chirag R Patel
(74) *Attorney, Agent, or Firm* — Hewlett Packard Enterprise Patent Department

(57) ABSTRACT

A system and a method of preventing generation of duplicate network routes in a Software Defined Wide Area Network (SD-WAN) are described. A network route management service receives network route information from a network device connected to a subnetwork present in the SD-WAN. The network route information is compared with a master network route information for identifying presence of one or more duplicate network routes in the network route information. Upon identification, the duplicate network routes are removed from the network route information, and the network route information excluding the one or more duplicate network routes is transmitted to the network device.

20 Claims, 4 Drawing Sheets

(51) Int. Cl.
*H04L 45/02* (2022.01)
*H04L 45/24* (2022.01)
*H04L 45/74* (2022.01)

(58) Field of Classification Search
CPC ..... H04L 41/0893; H04L 61/00; H04L 45/00; H04L 47/00; H04L 45/54
USPC .......................................................... 709/238
See application file for complete search history.

(56) References Cited

U.S. PATENT DOCUMENTS

| | | | |
|---|---|---|---|
| 9,667,592 B2* | 5/2017 | Markovitz | H04L 45/745 |
| 2004/0090913 A1* | 5/2004 | Scudder | H04L 45/54 |
| | | | 370/219 |
| 2005/0018602 A1* | 1/2005 | Labovitz | H04L 41/142 |
| | | | 370/254 |
| 2005/0207447 A1 | 9/2005 | Sekiguchi et al. | |
| 2005/0232256 A1* | 10/2005 | White | H04L 41/0846 |
| | | | 370/360 |
| 2007/0180139 A1* | 8/2007 | Oguchi | H04L 12/66 |
| | | | 709/238 |
| 2008/0291925 A1* | 11/2008 | Fisher | H04L 45/42 |
| | | | 370/400 |
| 2010/0118714 A1* | 5/2010 | Labovitz | H04L 41/142 |
| | | | 370/252 |
| 2010/0124170 A1* | 5/2010 | Xu | H04L 41/0631 |
| | | | 370/242 |
| 2011/0040858 A1* | 2/2011 | Gum | H04L 61/5014 |
| | | | 709/222 |
| 2012/0275311 A1 | 11/2012 | Ivershen et al. | |
| 2015/0039768 A1* | 2/2015 | Matczynski | H04L 47/781 |
| | | | 709/226 |
| 2015/0281045 A1* | 10/2015 | Torvi | H04L 47/825 |
| | | | 370/228 |
| 2019/0140937 A1* | 5/2019 | Kumar | H04L 45/127 |
| 2019/0319877 A1* | 10/2019 | Matsushita | H04L 45/02 |
| 2019/0334813 A1* | 10/2019 | Raj | H04L 45/48 |
| 2019/0334866 A1* | 10/2019 | Theogaraj | H04L 12/1886 |
| 2020/0084646 A1 | 3/2020 | Melderis | |
| 2020/0177503 A1* | 6/2020 | Hooda | H04L 12/66 |
| 2020/0235992 A1 | 7/2020 | Harneja et al. | |
| 2020/0410809 A1* | 12/2020 | Gotlieb | G06Q 20/387 |
| 2021/0112034 A1* | 4/2021 | Sundararajan | H04L 41/0893 |
| 2021/0288881 A1* | 9/2021 | Zhang | H04L 12/4633 |
| 2021/0297383 A1* | 9/2021 | Bagwell | H04L 61/1511 |
| 2021/0344591 A1* | 11/2021 | Kondalam | H04L 45/16 |
| 2022/0070146 A1* | 3/2022 | Gerstel | H04L 12/2854 |

FOREIGN PATENT DOCUMENTS

| | | | | |
|---|---|---|---|---|
| WO | WO-2009088885 A1 * | 7/2009 | ......... | G01C 21/3415 |
| WO | WO-2017078948 A1 * | 5/2017 | ......... | H04L 41/0668 |
| WO | WO-2021055634 A1 * | 3/2021 | ............ | H04L 45/02 |

OTHER PUBLICATIONS

Beyond Device Management: Route Analytics for Management of Dynamic Routing in IP Networks C. Alaettinoglu 2006 IEEE/IFIP Network Operations and Management Symposium NOMS 2006 Year: 2006 | Conference Paper | Publisher: IEEE (Year: 2006).*
Beyond Device Management: Route Analytics for Management of Dynamic Routing in IP Networks C. Alaettinoglu 2006 IEEE/IFIP Network Operations and Management Symposium NOMS 2006 Year: 2006 | Conference Paper | Publisher: IEEE (Year: 2006) (Year: 2006).*
A Novel Multiple Routes Discovery Scheme for Mobile Ad Hoc Networks Fang Xie; Lei Du; Yong Bai; Lan Chen 2006 Asia-Pacific Conference on Communications Year: 2006 | Conference Paper | Publisher: IEEE (Year: 2006).*
A Review of Scalability Issues in Software-Defined Exchange Point (SDX) Approaches: State-of-the-Art Published in: IEEE Access (vol. 9, pp. 74499-74509) Abdijalil Abdullahi • Selvakumar Manickam • Shankar Karuppayah Publication Date: Jan. 1, 2021 (Year: 2021).*

* cited by examiner

PREVENTING GENERATION OF DUPLICATE NETWORK ROUTES IN A SOFTWARE DEFINED WIDE AREA NETWORK

BACKGROUND

Computer networks are used to connect multiple network devices together and provide data communication between them. Based on their scale, the computer networks are classified as Local Area Network (LAN) or Wide Area Network (WAN). A Software Defined Wide Area Network (SD-WAN) vastly modifies implementation structure and enhances capability of a traditional WAN by implementing overlay networks above underlay networks i.e. existing physical infrastructure of communication networks. The overlay networks are secure network tunnels, such as VPN tunnels, established between different subnetworks connected together to form the SD-WAN.

Network devices such as VPN Concentrators (VPNCs) maintain information of all subnetworks present within an SD-WAN and details of subnet Internet Protocol (IP) and network routes used by network devices connected within each subnetwork. A network route management service, such as an Overlay Route Orchestration (ORO) service configured to collect the network route information from different sources, such as the VPNCs, and advertise network routes within subnetworks present in the SD-WAN, in a dynamic manner.

BRIEF DESCRIPTION OF THE DRAWINGS

The accompanying drawings constitute a part of the description and are used to provide further understanding of the present disclosure. Such accompanying drawings illustrate the embodiments of the present disclosure which are used to describe the principles related to the present disclosure. The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

In a Software Defined Wide Area Network (SD-WAN) deployed on a large scale, multiple subnetwork gateways and Virtual Private Network Concentrators (VPNCs) would exist. In such SD-WAN's, a high probability exists that multiple private network subnets would fall under the same range. Further, network misconfigurations could also lead to matching Internet Protocol (IP) subnets at different subnetworks. Such issues could lead to allocation of duplicate IP address to different network devices present in different subnetworks. When a network route management service, such as an Overlay Route Orchestration (ORO) service, is implemented to formulate complex network topologies, such as a mesh topology of the subnetworks, there are chances that duplicate network routes are learned on VPNCs for traffic routing. In such instances, when data traffic is routed based on Equal-Cost Multi Path (ECMP) routing technique, routing issues would arise. The routing issues arise because for the data traffic travelling in a downstream direction to the subnetworks i.e. North to South direction, duplicate network routes and network devices having duplicate IP addresses may be found. Due to such duplicate network routes and network devices having duplicate IP addresses, data could get delivered to unintended network devices, thereby causing loss of information. Further, in mesh topologies, data traffic travelling in an upstream direction i.e. South to North direction is also affected along with the traffic travelling in downstream direction i.e. North to South direction.

The current disclosure proposes a system and a method for enabling a network route management service to prevent duplicate network routes being generated and learnt, and duplicate Internet Protocol (IP) subnets and IP address being assigned in an SD-WAN. The network route management service compares network route information received from a network device with master network route information i.e. network route information learnt from other devices, to identify duplicate network routes. Such duplicate network routes, if identified, are excluded from the network route information before sharing the network device.

The detailed description set forth below in connection with the appended drawings is intended as a description of various embodiments of the present disclosure and is not intended to represent the only embodiments in which details of the present disclosure may be implemented. Each embodiment described in this disclosure is provided merely as an example or illustration, and should not necessarily be construed as preferred or advantageous over other embodiments.

Figure 1:
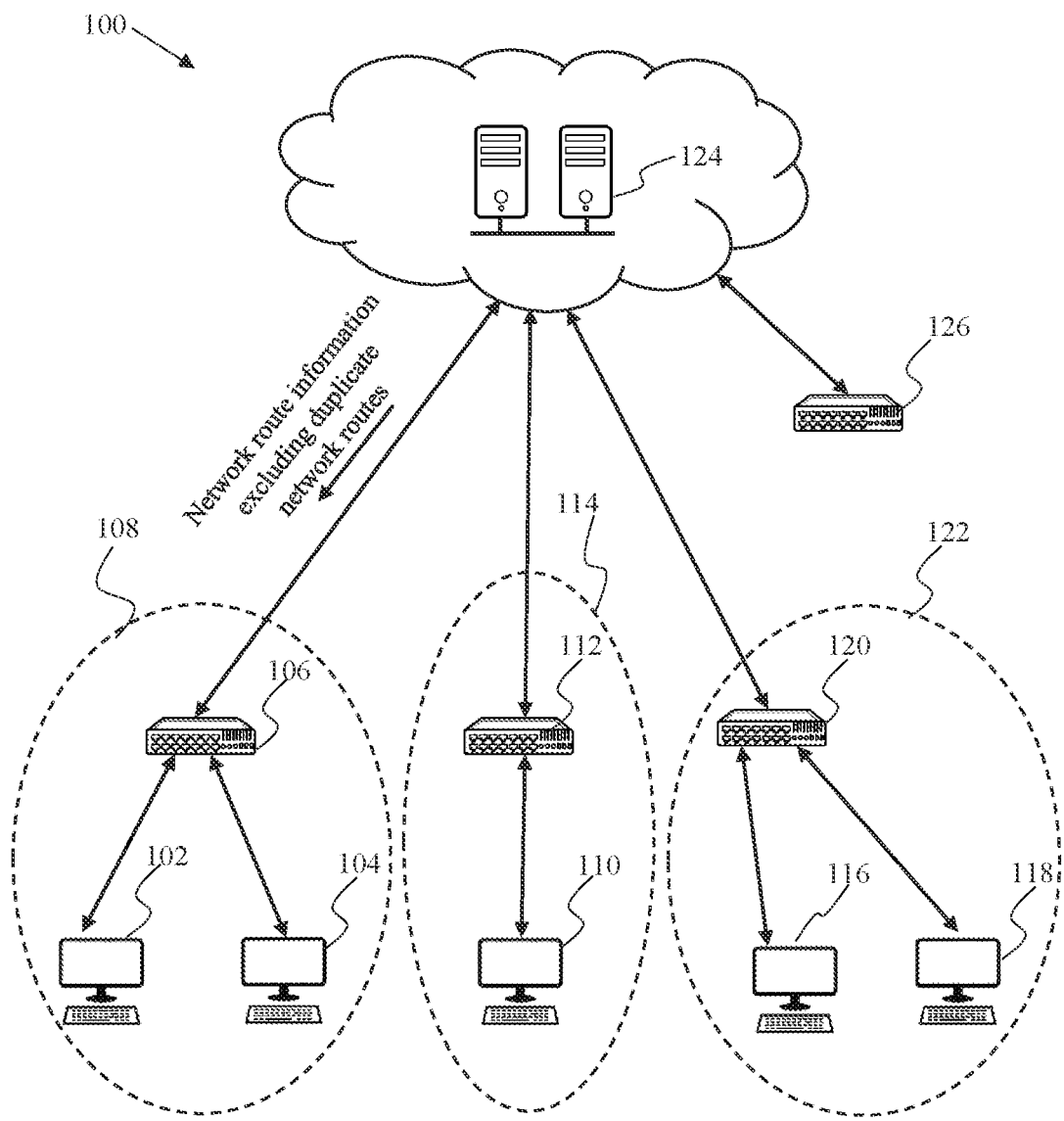
FIG. 1 illustrates a network connection diagram of a Software Defined Wide Area Network (SD-WAN) integrated with a network route management service, in accordance with an embodiment of the present disclosure.

FIG. 1 illustrates a network connection diagram of a Software Defined Wide Area Network (SD-WAN) 100 integrated with a network route management service, in accordance with an embodiment of the present disclosure. The SD-WAN 100 comprises several user devices connected to one or more subnetworks present within the SD-WAN 100. For example, as illustrated in FIG. 1, user devices 102 and 104 are connected with a network device i.e. a Customer Premise Equipment (CPE) 106 configured to provide data connectivity in a first subnetwork 108; user device 110 is connected with a CPE 112 configured to provide data connectivity in a second subnetwork 114; and user devices 116 and 118 are connected with a CPE 120 configured to provide data connectivity in a third subnetwork 122. The user devices 102, 104, 110, 116, and 118 may be one of printers, scanners, Internet Protocol (IP) telephones, laptops, desktops, smart phones, tablets, etc.

The CPEs 106, 112, and 120 may be network routers or network switches and may be connected with a cloud device 124 on which a network route management service is configured. The network route management service, such as an Overlay Route Orchestration (ORO) service, may be configured to manage network address and network routes of one or more user devices connected within the subnetworks 108, 114, and 122, and details of network tunnels established within or between the subnetworks 108, 114, and 122. The network route management service is implemented with the help of Overlay Agent Protocol (OAP). OAP allows exchange or redistribution of Wide Area Network (WAN) routing and WAN reachability information, and network route information related to overlay networks and underlay networks configured within the SD-WAN 100 with the network route management service. Using the OAP, local network routes of user devices and tunnel states are communicated to the network route management service, and WAN routes are received from the network route management service. Further, a network route aggregating device 126, such as a Virtual Private Network Concentrator (VPNC) may also be connected with the cloud device 124. In one implementation, the CPEs 106, 112, and 120 may communicate with the cloud device 124 hosting the network route management service, through the VPNC 126.

During operation, one CPE, for example CPE 106 sends network route information to the network route management service. The network route management service compares the network route information received from the CPE 106 with a master network route information i.e. network route information previously received from other sub-networks managed by the network route management service, such as the network route information related to network/user devices connected in the second subnetwork 114 and the third subnetwork 122. With such comparison, the network route management service identifies presence of any duplicate network route, subnet Internet Protocol (IP), and IP address in the network route information received from the CPE 106. If identified, the duplicate network route, subnet Internet Protocol (IP), and IP address are removed and the network route information excluding the one or more duplicate network routes is transmitted to the CPE 106. Further, the network route information excluding the one or more duplicate network routes is also transmitted to the CPEs 112 and 120.

Figure 2:
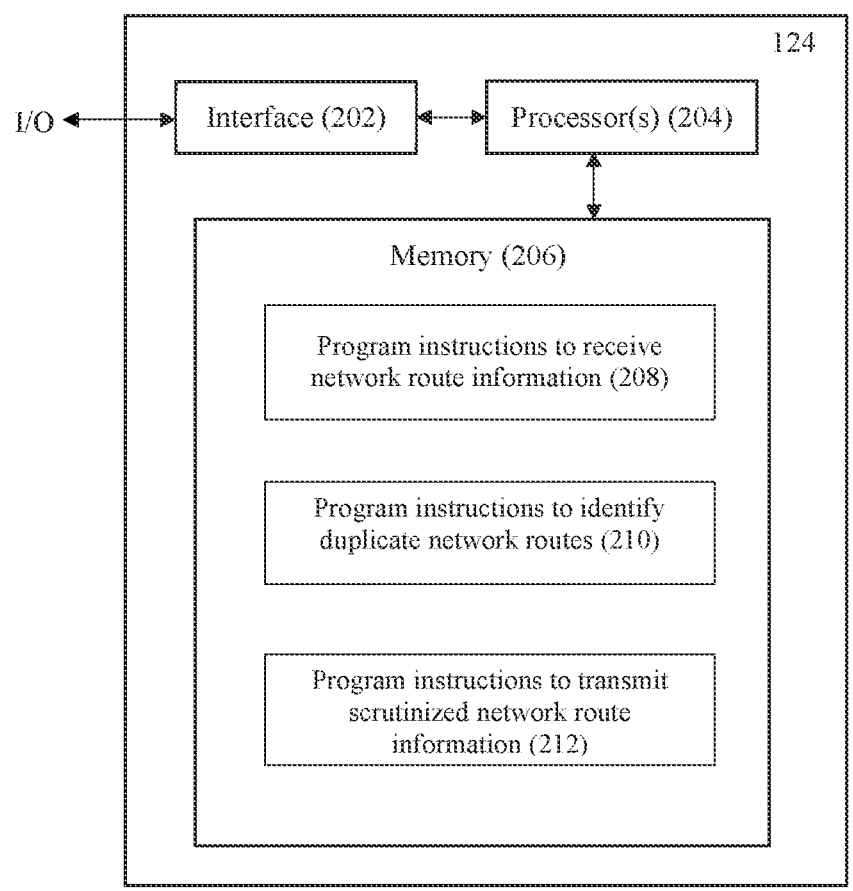
FIG. 2 illustrates a block diagram showing different components of a cloud device running the network route management service, in accordance with an embodiment of the present disclosure.

FIG. 2 illustrates a block diagram showing different components of the cloud device 124 running the network route management service, in accordance with an embodiment of the present disclosure. The cloud device 124 may comprise an interface 202, processor(s) 204, and a memory 206. The memory 206 may store program instructions for performing several functions for managing network routes in the SD-WAN 100. A few such program instructions stored in the memory 206 includes program instructions to receive network route information 208, program instructions to identify duplicate network routes 210, and program instructions to transmit scrutinized network route information 212.

The program instructions to receive network route information 208 causes the processor(s) 204 to receive network route information from a network device connected to one of a plurality of subnetworks present in a Software Defined Wide Area Network (SD-WAN). The program instructions to identify duplicate network routes 210 causes the processor(s) 204 to compare the network route information with a master network route information for identifying presence of one or more duplicate network routes in the network route information. The master network route information includes network route information learnt from one or more other network devices connected to the plurality of subnetworks. Upon identification, the one or more duplicate network routes are removed from the network route information. The program instructions to transmit scrutinized network route information 212 causes the processor(s) 204 to transmit the network route information excluding the one or more duplicate network routes to the network device.

Figure 3:
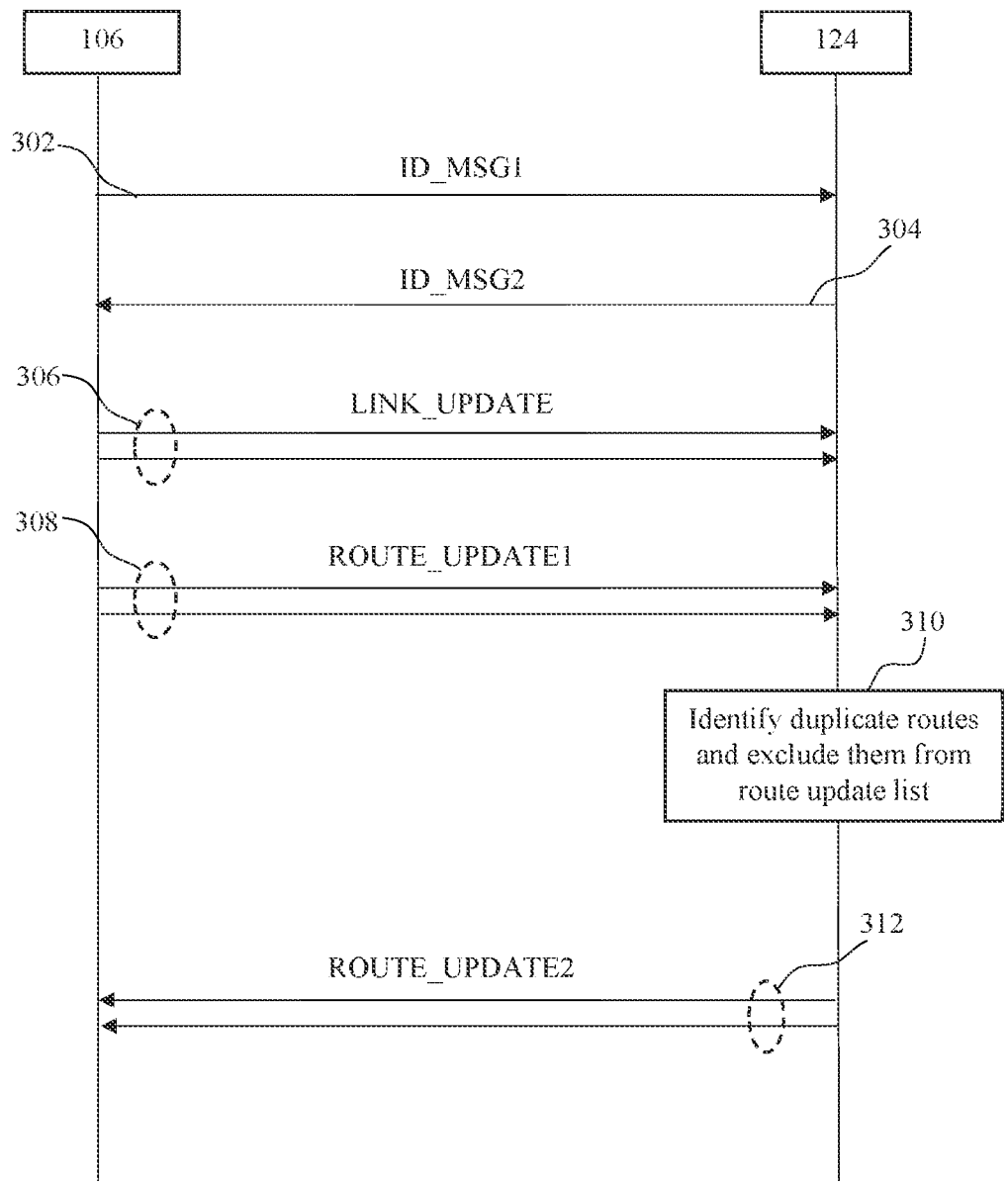
FIG. 3 illustrates a data flow diagram showing information exchange between a subnetwork and a network route management service, in accordance with an embodiment of the present disclosure.

FIG. 3 illustrates a data flow diagram showing information exchange between a subnetwork and the network route management service. On one end, a sender or recipient of the information would be a CPE managing the subnetwork, such as the CPE 106 managing the first subnetwork 108. On another end, a sender or a recipient of the information would be the cloud device 124 hosting the network route management service. As described earlier, the CPE 106 would communicate directly with the cloud device 124 in most implementations; however, in certain implementation, the communication between the CPE 106 and the cloud device 124 could occur through the VPNC 126. Therefore, for ease of explanation, the cloud device 124 hosting the network route management service is described to be communicating with the CPE 106 henceforth. Further, a Control Loop Agent (CLA) configured on the CPE 106 would manage the communication occurring with the CPE 106, and an Nginx web server configured to work with the cloud device 124 would manage the communication occurring with the cloud device 124 hosting the network route management service.

At instance 302, device identity information (ID_MSG1) related to the first subnetwork 108 may be transmitted to the network route management service implemented at the cloud device 124, The device identity information (ID_MSG1) may be transmitted to the network route management service by the CPE 106. In one implementation, the device identity information (ID_MSG1) may be transmitted through the Overlay Agent Protocol (OAP). The device identity information (ID_MSG1) may include details such as, but not limited to, network device's Media Access Control (MAC) address, network device's serial number, and network device's site identity.

At instance 304, the network route management service implemented at the cloud device 124 sends its identity information (ID_MSG2) to the CPE 106. Upon receipt of the identity information (ID_MSG2) from the network route management service, the CPE 106 advances its state to CONNECTED, and initiates successive data transmission to the network route management service.

At instance 306, the CPE 106 advertises network tunnel information to the network route management service through LINK_UPDATE messages. Successively, at instance 308, the CPE 106 advertises network route information to the network route management service through ROUTE_UPDATE1 messages. The network route information would include the subnet Internet Protocol (IP) to be used for allocating Internet Protocol (IP) addresses to the user devices connected within the first subnetwork 108.

Because the network route management service implemented on the cloud device 124 keeps collecting network route information associated with all the subnetworks present in the SD-WAN, it must be understood that before receiving the network route information associated with the first subnetwork 108, the network route management service already has the network route information related to the second subnetwork 114 and the third subnetwork 122 (cumulatively referred later as master route information). The master network route information comprises network address of user devices from which the network routes are received, network address of Local Area Network (LAN) side router from which the network routes originated, details of WAN service over which the network routes are distributed, details of site from where the network route originated, details of preferred data centers, source protocol associated with the network routes, and metric and cost assigned to the network routes.

The master route information is also supplemented by route configuration files, such as l3d.conf files. Such route configuration files are maintained by the CPE 106, 112, and 120, and include information learned from all possible routing configurations and routing protocols.

At instance 310, the network route management service compares the network route information associated with the first subnetwork 108 with the master network route information for identifying presence of one or more duplicate network routes. Upon identifying the one or more duplicate network routes, duplicate subnet Internet Protocol (IP), and duplicate IP address, the network route management service removes them from the network route information associated with the first subnetwork 108. Further, such one or more duplicate network routes, duplicate subnet Internet Protocol (IP), and duplicate IP address are tagged with a "DO_NOT_ADD" flag. Further, such details may be presented to a network administrator managing the network route management service. From such details, the network administrator may be informed about network address conflicts overcome by the network route management service.

While comparing the network route information associated with the first subnetwork 108 with the master network route information, the network route management service may also identify one or more redundant network routes that are a part of High-Availability (HA) redundancy topology. Such redundant network routes may be identified based on network configurations defined on the cloud device 124. Upon identification, the network route management service would allow such one or more redundant network routes to remain in the network route information associated with the first subnetwork 108.

At instance 312, network route information excluding the one or more duplicate network routes, duplicate subnet Internet Protocol (IP), and duplicate IP address is transmitted to the CPE 106 as ROUTE_UPDATE2 messages. Such network route information may be utilized by the first subnetwork 108 for allocation to the user devices 102 and 104. In this manner, network address conflicts that are caused due to allocation of duplicate IP address to different user devices present in different subnetworks of the SD-WAN are averted.

In one implementation, the network route management service may determine available IP subnets. The network route management service may determine the available IP subnets based on the master/consolidated network route information. In one case, the available IP subnets are determined using the below provided equation.

$$S(Z)=S(2^n-x)+S(2^r-x)-S(Y) \qquad \text{Equation 1}$$

In above mentioned equation, 'Z' denotes the available IP subnets, 'n' denotes number of bits taken from host portion, $2^n-x$ denotes number of possible subnets with host portion occupied in subnet calculation, 'r' denotes number of bits remaining in the host portion, $2^r-x$ denotes number of possible subnets with host portion remaining in the subnet calculation, 'x' denotes bits that are turned ON and OFF, and Y set corresponds to already available subnet list.

The process of identification of available IP subnets could be understood with an example. In one scenario, IP subnets 192.168.21.0/24 to 192.168.30.0/24 may be used in the SD-WAN 100. Using the above provided Equation 1, available IP subnets are calculated, as depicted below.

$S(2^n-x)$[192.168.1.0/24, 192.192.168.2.0/24, . . . 192.168.30.0/24]+$S(2^r-x)$[192.168.31.0/24, 192.168.32.0/24, . . . 192.168.254.0/24]−$S(Y)$ [192.168.21.0/24, 192.168.22.0/24, . . . 192.168.30/24]=$S(Z)$[192.168.1.0/24, 192.168.2.0/24, . . . 192.168.20.0/24, 192.168.31.0/24, 192.168.32.0/24, . . . 192.168.254.0/24]

In this manner, as described above, available IP subnets 192.168.1.0/24, 192.168.2.0/24, . . . 192.168.20.0/24, 192.168.31.0/24, 192.168.32.0/24, . . . 192.168.254.0/24 may be determined.

Once determined, the available IP subnets may be suggested to the network administrator. The network administrator may allocate such available IP subnets to the network devices for which duplicate network routes are identified in subnetworks of the SD-WAN 100. In one implementation, the network route management service may deliver the available IP subnets to a CPE, for example to the CPE 106 when duplicate network routes are identified in the first subnetwork 108. The CPE 106 may utilize the available IP subnets such that the user devices 102 and 104 have distinct IP addresses assigned to them.

Figure 4:
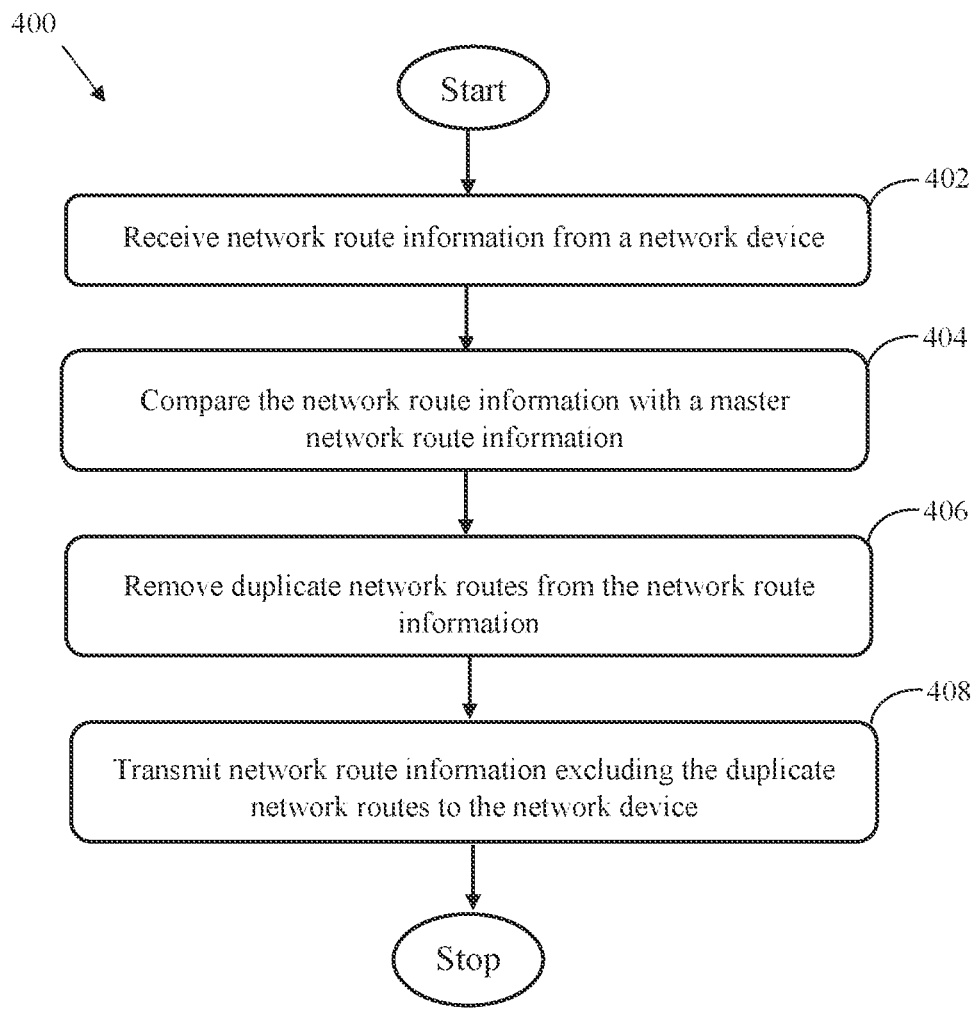
FIG. 4 illustrates a flowchart showing a method of preventing generation of duplicate network routes in an SD-WAN, in accordance with an embodiment of the present disclosure.

Referring now to flowchart 400 illustrated in FIG. 4, a method of preventing generation of duplicate network routes in an SD-WAN is described. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 4 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

At block 402, a network route management service implemented over a cloud device receives network route information from a network device. The network device may be connected to a subnetwork present in a Software Defined Wide Area Network (SD-WAN).

At block 404, the network route information is compared with a master network route information for identifying presence of duplicate network routes in the network route information. The master network route information includes network route information learnt from other network devices connected to the subnetwork or other subnetworks present in the SD-WAN.

At block 406, the duplicate network routes are removed from the network route information. At block 408, the network route information excluding the duplicate network routes is transmitted to the network device.

An embodiment of the disclosure may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set as claimed in claims that issue from this application, in the specific form in which such claims issue, including any subsequent correction.

An interface may be used to provide input or fetch output from the system. The interface may be implemented as a Command Line Interface (CLI), Graphical User Interface (GUI). Further, Application Programming Interfaces (APIs) may also be used for remotely interacting with the system.

A processor may include one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor). MIPS/ARM-class processor, a microprocessor, a digital signal processor, an application specific integrated circuit, a microcontroller, a state machine, or any type of programmable logic array.

A memory may include, but is no limited to, non-transitory machine-readable storage devices such as hard drives, magnetic tape, floppy diskettes, optical disks. Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

We claim:

1. A method comprising:
  receiving, by a route management service running on a cloud device, route information from network devices in a plurality of subnetworks present in a Software Defined Wide Area Network (SD-WAN), wherein the cloud device is distinct from the network devices;
  incorporating the route information into primary route information maintained at the route management service;
  receiving, by the route management service, new route information from a first network device in a first subnetwork of the plurality of subnetworks, wherein the new route information indicates routes according to a routing protocol, the routes determined by the first network device;
  identifying, by the route management service, presence of a duplicate route in the new route information by comparing the new route information with the primary route information;
  generating updated route information by removing, by the route management service, the duplicate route from the new route information to produce the updated route information referring to a first route indicated by the new route information and excluding a second route indicated by the new route information, the second route being the duplicate route; and
  sending, by the route management service, the updated route information to the first network device, the updated route information allocated to devices in the first subnetwork.

2. The method of claim 1, wherein the route information received from the network devices identifies routes comprising network tunnels that include overlay networks over an underlay network within the SD-WAN.

3. The method of claim 2, wherein the route management service operates according to an Overlay Agent Protocol (OAP).

4. The method of claim 1, wherein the first network device manages the first subnetwork.

5. The method of claim 1, wherein the primary route information comprises information of routes in the SD-WAN learnt by the route management service from the network devices.

6. The method of claim 1, comprising:
  identifying, by the route management service, presence of a duplicate Internet Protocol (IP) address in the new route information by comparing the new route information with the primary route information; and
  generating the updated route information further by removing, by the route management service, the duplicate IP address from the new route information received from the first network device,
  wherein the updated route information sent by the route management service to the first network device excludes the duplicate IP address.

7. The method of claim 1, further comprising:
  identifying, by the route management service, a redundant route that is part of a High-Availability (HA) redundancy topology in the SD-WAN; and
  allowing the redundant route to remain in the updated route information,
  wherein the updated route information sent by the route management service to the first network device includes the redundant route.

8. The method of claim 1, further comprising providing, by the route management service, information indicating the presence of the duplicate route in the new route information to a network administrator.

9. The method of claim 1, further comprising:
  determining, by the route management service, available Internet Protocol (IP) subnets based on IP subnets identified in the primary route information; and
  assigning, by the route management service, a first available IP subnet of the available IP subnets to the first network device based on the identification by the route management service of the presence of the duplicate route in the new route information.

10. A system comprising:
a processor; and
a non-transitory storage medium storing instructions of a route management service, the instructions executable on the processor to:

receive, at the route management service, route information from network devices in a plurality of subnetworks present in a Software Defined Wide Area Network (SD-WAN), wherein the system is distinct from the network devices;

incorporate the route information into primary route information maintained by the route management service;

receive, at the route management service, new route information from a first network device in a first subnetwork of the plurality of subnetworks, wherein the new route information indicates routes according to a routing protocol that are determined by the first network device;

identify, by the route management service, presence of a duplicate route in the new route information by comparing the new route information with the primary route information;

remove, by the route management service, the duplicate route from the new route information to generate updated route information referring to a first route indicated by the new route information and excluding a second route indicated by the new route information, the second route being the duplicate route; and send, from the route management service, the updated route information to the first network device, the updated route information allocated to devices connected to the first subnetwork.

11. The system of claim 10, wherein the network devices comprise network routers or network switches, and the first network device comprises a first network router or a first network switch.

12. The system of claim 10, wherein the instructions are executable on the processor further to:

identify, by the route management service, presence of a duplicate Internet Protocol (IP) address in the new route information by comparing the new route information with the primary route information; and generate the updated route information further by removing, by the route management service, the duplicate IP address from the new route information, wherein the updated route information sent by the route management service to the first network device excludes the duplicate IP address.

13. The system of claim 10, wherein the instructions are executable on the processor further to:

identify, by the route management service, a redundant route that is part of a High-Availability (HA) redundancy topology in the SD-WAN; and allow the redundant route to remain in the updated route information, wherein the updated route information sent by the route management service to the first network device includes the redundant route.

14. The system of claim 10, wherein the instructions are executable on the processor further to provide, from the system, information associated with the presence of the duplicate route in the new route information to a network administrator.

15. The system of claim 10, wherein the instructions are executable on the processor further to:

determine, by the route management service, available Internet Protocol (IP) subnets based on IP subnets identified in the primary route information; and assign, by the route management service, a first available IP subnet of the available IP subnets to the first network device based on the identification by the route management service of the presence of the duplicate route in the new route information.

16. A non-transitory machine-readable storage medium comprising instructions of a route management service, the instructions upon execution causing a cloud device to:

receive, at the route management service in the cloud device, route information from network devices in a plurality of subnetworks present in a Software Defined Wide Area Network (SD-WAN), wherein the cloud device is distinct from the network devices;

incorporate the route information into primary route information maintained at the route management service;

receive, at the route management service, new route information from a first network device in a first subnetwork of the plurality of subnetworks, wherein the new route information indicates routes according to a routing protocol that are determined by the first network device;

identify, by the route management service, presence of a duplicate route in the new route information by comparing the new route information received from the first network device with the primary route information;

generate, by the route management service, updated route information by removing, by the route management service, the duplicate route from the new route information to produce the updated route information referring to a first route indicated by the new route information and excluding a second route indicated by the new route information, the second route being the duplicate route; and send, from the route management service, the updated route information to the first network device, the updated route information allocated to devices connected to the first subnetwork.

17. The non-transitory machine-readable storage medium of claim 16, wherein the instructions upon execution cause the cloud device to:

identify, by the route management service, a redundant route that is part of a High-Availability (HA) redundancy topology in the SD-WAN; and allow the redundant route to remain in the updated route information, wherein the updated route information sent by the route management service to the first network device includes the redundant route.

18. The non-transitory machine-readable storage medium of claim 16, wherein the instructions upon execution cause the cloud device to:

identify, by the route management service, presence of a duplicate Internet Protocol (IP) address in the new route information by comparing the new route information with the primary route information; and generate the updated route information further by removing, by the route management service, the duplicate IP address from the new route information, wherein the updated route information sent by the route management service to the first network device excludes the duplicate IP address.

19. The non-transitory machine-readable storage medium of claim 16, wherein the instructions upon execution cause the cloud device to:

determine, by the route management service, available Internet Protocol (IP) subnets based on IP subnets identified in the primary route information; and assign, by the route management service, a first available IP subnet of the available IP subnets to the first network device based on the identification by the route management service of the presence of the duplicate route in the new route information.

20. The non-transitory machine-readable storage medium of claim 16, wherein the primary route information comprises information of routes in the SD-WAN that were learnt by the route management service from the network devices.

* * * * *